United States Patent
Ito et al.

(10) Patent No.: US 10,122,066 B2
(45) Date of Patent: Nov. 6, 2018

(54) HORN ANTENNA

(71) Applicant: TOKYO KEIKI INC., Tokyo (JP)

(72) Inventors: Satoshi Ito, Tokyo (JP); Masaki Shimizu, Tokyo (JP); Daisuke Kobayashi, Tokyo (JP)

(73) Assignee: TOKYO KEIKI INC., Tokyo (JP)

( * ) Notice: Subject to any disclaimer, the term of this patent is extended or adjusted under 35 U.S.C. 154(b) by 12 days.

(21) Appl. No.: 15/300,748

(22) PCT Filed: Mar. 25, 2015

(86) PCT No.: PCT/JP2015/059175
§ 371 (c)(1),
(2) Date: Sep. 29, 2016

(87) PCT Pub. No.: WO2015/151967
PCT Pub. Date: Oct. 8, 2015

(65) Prior Publication Data
US 2017/0018836 A1    Jan. 19, 2017

(30) Foreign Application Priority Data

Mar. 31, 2014  (JP) ................... 2014-071989
Jun. 9, 2014  (JP) ................... 2014-118279

(51) Int. Cl.
*H01Q 1/22* (2006.01)
*G01F 23/284* (2006.01)
(Continued)

(52) U.S. Cl.
CPC ........... *H01Q 1/225* (2013.01); *G01F 23/284* (2013.01); *G01S 7/03* (2013.01); *G01S 13/88* (2013.01); *H01Q 13/02* (2013.01); *H01Q 19/08* (2013.01)

(58) Field of Classification Search
CPC ........ H01Q 1/225; H01Q 19/08; H01Q 13/02; G01S 7/03; G01S 13/88; G01F 23/284
See application file for complete search history.

(56) References Cited

U.S. PATENT DOCUMENTS 2,283,935 A    5/1942  King
2,547,416 A    3/1951  Skellett
(Continued)

FOREIGN PATENT DOCUMENTS

DE    102008015409 A1    9/2009
EP       0 427 567 A2    5/1991
(Continued)

OTHER PUBLICATIONS

International Search Report (ISR) (PCT Form PCT/ISA/210), in PCT/JP2015/059175, dated Jun. 9, 2015.
(Continued)

*Primary Examiner* — Jessica Han
*Assistant Examiner* — Michael Bouizza
(74) *Attorney, Agent, or Firm* — McGinn I.P. Law Group, PLLC.

(57) ABSTRACT

A horn antenna includes a metallic horn having a rear end adapted for connection with a waveguide. The horn antenna further includes a dielectric horn connected with the metallic horn and extending forward from a front end of the metallic horn. The dielectric horn includes: i) a metallic horn filler section adapted for filling an internal space of the metallic horn; ii) a waveguide filler section formed to extend rearward from a rear end of the metallic horn filler section and adapted for filling an internal space of a section of a predetermined length of the waveguide; and iii) a flared end section having a frustum shaped internal space, which is formed to flare out toward the front end of the dielectric horn. The metallic horn and the flared end section of the (Continued)

dielectric horn have respective cross sections whose outer contours are the same as each other.

15 Claims, 3 Drawing Sheets

(51) Int. Cl.
    *H01Q 13/02*     (2006.01)
    *G01S 7/03*     (2006.01)
    *G01S 13/88*     (2006.01)
    *H01Q 19/08*     (2006.01)

(56) References Cited

U.S. PATENT DOCUMENTS

| | | |
|---|---|---|
| 5,344,441 A | 9/1994 | Gronauer |
| 8,354,970 B2 | 1/2013 | Armbrecht et al. |
| 2015/0276459 A1* | 10/2015 | Sai .................. G01F 23/284 |
| | | 73/290 V |

FOREIGN PATENT DOCUMENTS

| | | |
|---|---|---|
| EP | 2 105 991 A1 | 9/2009 |
| JP | 28-005702 B1 | 11/1953 |
| JP | 09-164215 A | 6/1997 |

OTHER PUBLICATIONS

Extended European Search Report dated Oct. 26, 2017, in European Patent Application No. 15774416.0.

* cited by examiner

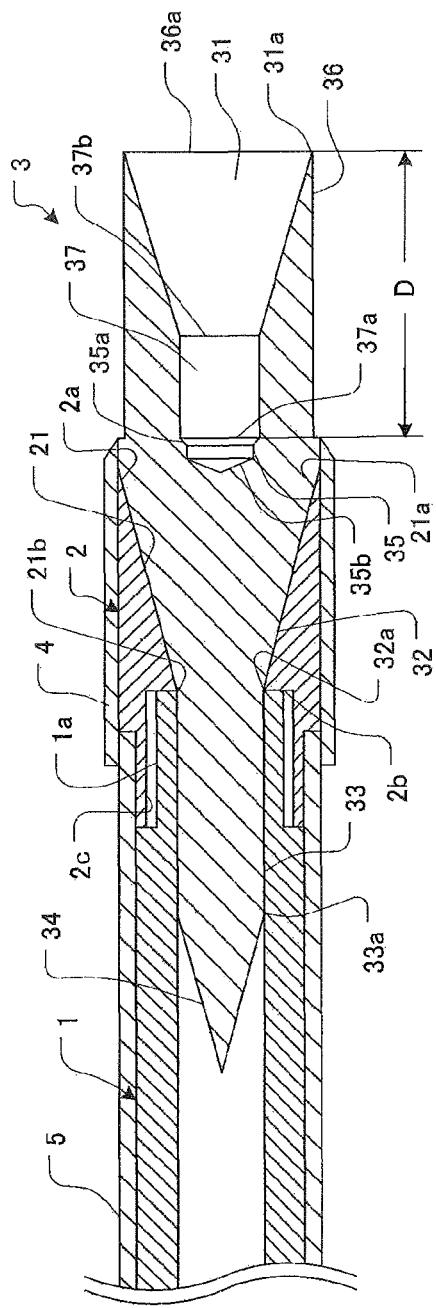
[Fig.1]

[Fig.2]
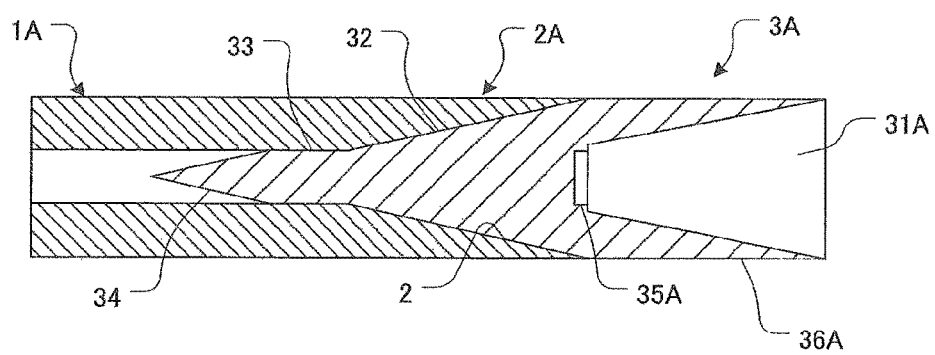
[Fig.3]
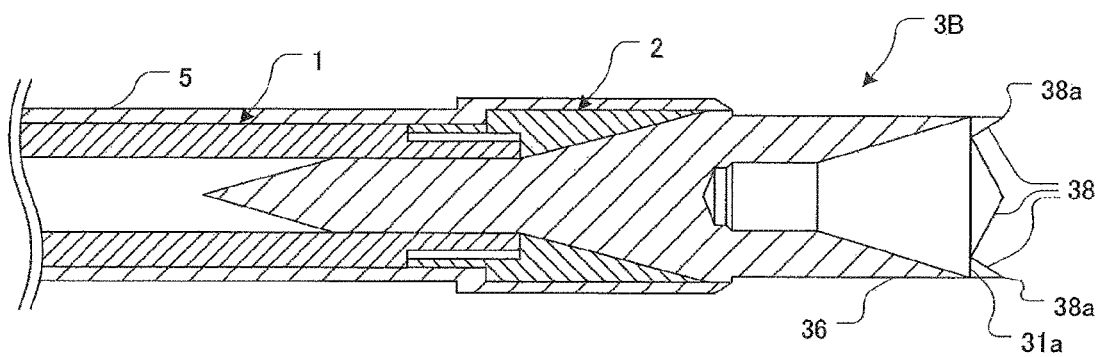

[Fig.4]
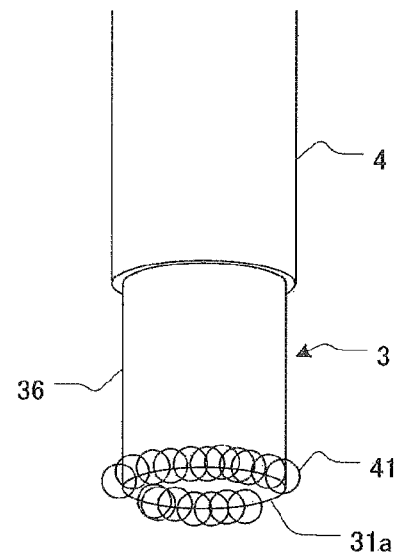
[Fig.5]
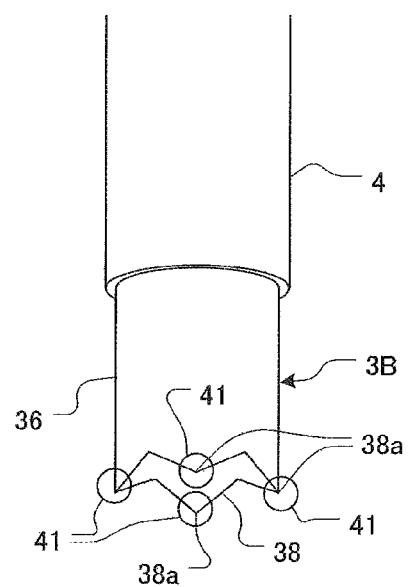

HORN ANTENNA

TECHNICAL FIELD

The present invention relates to a horn antenna for use as an antenna of a radar level gauge, which is a device for measuring a distance between the device and a measurement object by means of electromagnetic wave radiation.

BACKGROUND OF THE INVENTION

Among various types of prior art horn antennas, a tube antenna utilizing a dielectric element is known. A typical example of this type of a horn antenna is disclosed in Patent Document No. 1 listed below (U.S. Pat. No. 8,354,970 B2). The horn antenna disclosed there includes: a metallic circular waveguide having a flared, cone shaped front end; a dielectric circular waveguide having a rear end in connection with the front end of the metallic circular waveguide; and a dielectric horn provided at the front end of the dielectric circular waveguide.

In this horn antenna, the electromagnetic wave radiation is emitted dominantly from the dielectric horn. In comparison with a typical, fully metallic horn antenna having a certain antenna diameter, this horn antenna having about half the antenna diameter may be capable of providing nearly the same level of gain, as well as nearly the same level of directionality, as that which may be provided by the fully metallic horn antenna.

PRIOR ART DOCUMENT(S)

Patent Document(s)

Patent Document No. 1: U.S. Pat. No. 8,354,970 B2

SUMMARY OF THE INVENTION

Problems to be Solved by the Invention

The horn antenna disclosed in Patent Document No. 1 may, however, suffer from difficulties in manufacturing, particularly in cases where the horn antenna is designed for use in a frequency range falling within the near millimeter band, such as 26 GHz band range. With the horn antenna so designed, because of the shape of the metallic circular waveguide, as well as the shape of the dielectric horn, the thickness of the wall of the dielectric horn has to be very thin, which inevitably makes it difficult to manufacture the horn antenna.

Accordingly, it is an object of the present invention to provide a horn antenna, which is compact in size, is capable of providing an improved gain, has an improved directionality, is simple in structure and is easy to manufacture.
Resolution According to the present invention, the above object is achieved by a horn antenna comprising: a metallic horn having a front and a rear end, the rear end being adapted for connection with a waveguide having a cross section of constant shape; and a dielectric horn having a front end and a rear end, the dielectric horn being connected with the metallic horn and extending forward from the front end of the metallic horn; wherein the metallic horn has an opening at the rear end thereof, which opening has a cross section corresponding to the cross section of the waveguide, and the metallic horn further has a conical frustum shaped internal space flaring out from the opening toward the front end of the metallic horn; wherein the dielectric horn comprises: i) a metallic horn filler section having a front end and a rear end, the metallic horn filler section being adapted for filling the conical frustum shaped internal space of the metallic horn; ii) a waveguide filler section having a rear end, the waveguide filler section being formed to extend rearward from the rear end of the metallic horn filler section and adapted for filling an internal space of a section of a predetermined length of the waveguide; iii) a first impedance matching section formed at the rear end of the waveguide filler section and adapted for establishing impedance matching between the waveguide and the dielectric horn; iv) a second impedance matching section formed at the front end of the metallic horn filler section and at the center of a cross section of the metallic horn filler section, and adapted for establishing impedance matching between the dielectric horn and air; and v) a flared end section having a frustum shaped internal space, which is formed to flare out from in front of the second impedance matching section toward the front end of the dielectric horn and open at the front end of the dielectric horn; and wherein the metallic horn and the flared end section of the dielectric horn have respective cross sections whose outer contours are the same as each other and correspond to the outer contour of the cross section of the waveguide.

Advantages Provided by the Invention

According to the present invention, a horn antenna can be provided, which is compact in size, is capable of providing an improved gain, has an improved directionality, is simple in structure and is easy to manufacture.

BRIEF DESCRIPTION OF THE DRAWINGS

FIG. 1 is a longitudinal sectional view of a horn antenna according to Embodiment 1.

FIG. 2 is a longitudinal sectional view of a horn antenna according to Embodiment 2.

FIG. 3 is a longitudinal sectional view of a horn antenna according to Embodiment 3.

FIG. 4 is a schematic view of a horn antenna, for illustrating, in comparison thereto, an advantageous feature of the horn antenna according to Embodiment 3.

FIG. 5 is a schematic view of the horn antenna according to Embodiment 3, for illustrating an advantageous feature thereof.

EXEMPLARY MODE FOR CARRYING OUT THE INVENTION

Hereinafter, several embodiments of the present invention will be described with reference to the accompanying drawings.

Embodiment 1

A horn antenna according to Embodiment 1 of the present invention includes a metallic horn 2 having a front end 2a and a rear end 2b. The rear end 2b is adapted for connection with a waveguide, which is a circular waveguide 1 in this embodiment. The horn antenna further includes a dielectric horn 3 having a front end and a rear end. The dielectric horn 3 is connected with the metallic horn 2 and extends forward from the front end 2a of the metallic horn 2.

The metallic horn 2 has a cylindrical outer shape, which resembles to some extent the cylindrical outer shape of the circular waveguide 1, and the outer diameter of the metallic horn 2 is slightly larger than that of the circular waveguide 1, as shown in FIG. 1. The metallic horn 2 has a predetermined length in the longitudinal direction, which is determined depending on the wavelength of the electromagnetic waves to be radiated from the horn antenna, as well as on a cone flaring angle which is described later. The outer contour of the cross section of the metallic horn 2 is circular in shape and the metallic horn 2 has an axis extending through the center of the circular outer contour. (Here, the "cross section" means the section along a cutting plane which is perpendicular to the axis.) The metallic horn 2 has a conical frustum shaped internal space 21, which has an axis in alignment with the axis of the metallic horn 2 and provides the function of a horn. The inner diameter of the conical frustum shaped internal space 21 at the front end 21a of the space 21 is larger than that at the rear end 21b of the space 21, the latter inner diameter being equal to the inner diameter of the circular waveguide 1.

The dielectric horn 3 includes: i) a metallic horn filler section 32 being adapted for filling the conical frustum shaped internal space 21 of the metallic horn 2 (the internal space 21 extends from the front end 2a to the rear end 2b of the metallic horn 2); ii) a waveguide filler section 33 having a rear end, the waveguide filler section 33 being formed to extend rearward from the rear end 32a of the metallic horn filler section 32 and adapted for filling an internal space of a front end section of a predetermined length of the circular waveguide 1; iii) a first impedance matching section 34 formed to be conical in shape and extend rearward from the rear end 33a of the waveguide filler section 33, and adapted for establishing impedance matching between the circular waveguide 1 and the dielectric body (of the dielectric horn 3); iv) a second impedance matching section 35 formed in the dielectric horn 3 at the position that corresponds to the center of the opening of the metallic horn 2 at the front end 2a of the metallic horn 2, and adapted for establishing impedance matching between the dielectric body (of the dielectric horn 3) and air; v) a hollow rod section 37 having a cylindrical axial hole which extends a predetermined length from the front end of the second impedance matching section 35; and vi) a flared end section 36 having a conical frustum shaped internal space 31, which is formed to flare out from the front end of the hollow rod section 37 and thus from in front of the second impedance matching section 35 toward the front end of the dielectric horn 3 and open at the front end of the dielectric horn 3.

In addition to the metallic horn 2, each section of the dielectric horn 3 also has a circular cross section. The outer diameter of the metallic horn 2 at the front end 2a thereof, the diameter of the opening of the metallic horn 2, the outer diameter of the flared end section 36, and the diameter of the opening of the conical frustum shaped internal space 31 of the flared end section 36 are substantially equal to one another. When assembled, the metallic horn 2 and the dielectric horn 3 (more particularly, the flared end section 36) together form an outer shape resembling a single "cylinder", and the "cylinder" is in connection with the front end of the circular waveguide 1. The outer contour of the cross section of the "cylinder" is a circle which corresponds to that of the circular waveguide 1. Further, the longitudinal axis of the metallic horn 2, as well as the longitudinal axis of the flared end section 36, is in alignment with the axis of the circular waveguide 1.

The second impedance matching section 35 is formed at the rear end 37a of the hollow rod section 37 and includes: i) a first tapering surface 35a arranged to be in direct connection with the hollow rod section 36; and ii) a second tapering surface 35b arranged to form a step relative to the first tapering surface 35a. Alternatively, the second impedance matching section 35 may be formed to include no tapering surface, but include two or more flat surfaces forming stepwise shoulders.

The hollow rod section 37 is provided in order to appropriately define the distance D from the frontal edge of the front end 36a of the flared end section 36 to the second impedance matching section 35. The length of the hollow rod section 37 is so selected as to facilitate the manufacturing of the dielectric horn 3, with which the flaring angle of the flared end section 36 has to be set at a desired angle and the above mentioned distance D has to be set at a desired distance. Thus, a dielectric horn used in a horn antenna of the invention may or may not be required to have a hollow rod section, depending on the design of the horn antenna. The axes of the second impedance matching section 35, the hollow rod section 37 and the first impedance matching section 34 are also in alignment with the axis of the circular waveguide 1.

With the structure described above, the dielectric horn 3 is formed as a one-piece element. More particularly, the metallic horn filler section 32, the waveguide filler section 33 and the flared end section 36 are formed as respective sections of the one-piece element, which is manufactured by monolithic molding.

The circular waveguide 1 is manufactured separately from the metallic horn 2 and then connected to the rear end 2b of the metallic horn 2 by means of any appropriate method, such as welding. More particularly, in this embodiment, the circular waveguide 1 has an axial boss 1a formed on the front end, while the metallic horn 2 has a mating axial boss 2c. The axial boss 1a of the circular waveguide 1 is received in and engages the mating axial boss 2c and fixedly connected with the latter by means of welding.

The outer diameter of the circular waveguide 1 is slightly smaller than that of the metallic horn 2. The metallic horn 2 and the circular waveguide 1 have their whole outer circumferential surfaces covered by two fluoropolymer resin tubes 4 and 5, which are made of a perfluoroalkoxy polymer (PFA). A typical example of a PFA is a copolymer of tetrafluoroethylene and perfluoroalkoxyethylene. PFAs have chemical, electrical, mechanical and surface properties which are characteristic of the perfluoropolymer resins. In addition, PFAs also have properties of thermoplastic resins, which are suitable for hot melt molding, so that they can exhibit good workability in hot melt molding processes.

Hereinafter, the two tubes 4 and 5 made of a PFA are referred to as the "first PFA tube 4" and the "second PFA tube 5". In this embodiment, the first PFA tube 4 and the second PFA tube 5 cover the outer circumferential surfaces of the metallic horn 2 and the circular waveguide 1, respectively. These two separate PFA tubes 4 and 5 have different inner diameters. More particularly, the first PFA tube 4 has an inner diameter corresponding to the outer diameter of the metallic horn 2 and the second PFA tube 5 has an inner diameter corresponding to the outer diameter of the circular waveguide 1.

The use of the two separate PFA tubes 4 and 5, one for covering the outer circumferential surface of the metallic horn 2 and the other for covering that of the circular waveguide 1, is advantageous in that any impact of a possible expansion of the second PFA tube 5, which may be caused by changes in the surrounding temperature, can be reduced for the effect of the first PFA tube 4. This means that even if such an expansion of the second PFA tube 5 is caused, a creation of a gap between the metallic horn 2 and the dielectric body filled therein (i.e., the waveguide filler section 33 of the dielectric horn 3) can be effectively prevented. Alternatively, however, a single tube may be used in place of the two separate tubes 4 and 5 in cases where a possible gap which may occur there is expected to fall within an acceptable range.

When the horn antenna of this embodiment, constructed as above, is used as an antenna of a radar level gauge, electromagnetic waves are supplied by a main unit of the radar level gauge (not shown) into the circular waveguide 1. The supplied electromagnetic waves propagate the circular waveguide 1 of the waveguide filler section 33 through the first impedance matching section 34, and continue propagating forward along the metallic horn 2. Then, the electromagnetic waves continue propagating into and along the metallic horn filler section 32 confined in the metallic horn 2, while the area of the wave front of the electromagnetic waves expands in accordance with the growth of the cross section of the internal space of the metallic horn 2, which flares out from the connection with the circular waveguide 1 toward the front end 2a of the metallic horn 2. Then, the electromagnetic waves continue propagating to pass by the front end 2a of the metallic horn 2 and enter into the flared end section 36 of the dielectric horn 3. During propagating along the flared end section 36, a progressively increasing part of the power of the electromagnetic waves is radiated from the flared end section 36 to the free space nearby and around the flared end section 36, and finally, all of the power is radiated forward from the front end of the flared end section 36.

More specifically, the outer circumferential surface of the dielectric horn 3 is cylindrical in shape, while the inner surface of the dielectric horn 3 is so formed as to define the conical frustum shaped internal space 31, and the inner diameter of the internal space 31 increases as the distance from the metallic horn 2 increases. As the result, the thickness of the dielectric horn wall of the flared end section 36 is relatively large near the metallic horn 2 and progressively reduces toward the opening of the flared end section 36 defined at the front end 31a thereof. Consequently, the power of the electromagnetic waves is substantially confined inside the dielectric horn 3 when the electromagnetic waves propagate to pass by the front opening of the metallic horn 2, while the power of the electromagnetic waves progressively spreads out of the dielectric horn 3 and into the free space nearby and around the flared end section 36 during the propagation of the electromagnetic waves along the flared end section 36.

The power distribution of the electromagnetic waves on the plane of the radiation opening of the dielectric horn 3 (this plane lies on the frontal edge of the dielectric horn 3) is such that a part of the power has been spread even outside the outer diameter of the dielectric horn 3. As the result, the effective antenna opening area established by the power distribution is larger than the physical antenna opening area defined by the dielectric horn 3. This means that the inventive horn antenna is capable of providing a higher gain level than a conventional, fully metallic horn antenna having the same antenna diameter. In addition, since the dielectric horn for the inventive horn antenna may have a relatively simple shape, it may be relatively easy to manufacture.

Embodiment 2

Referring now to FIG. 2, a horn antenna according to Embodiment 2 will be described.

In FIG. 2, elements of the horn antenna that are identical or corresponding to those of Embodiment 1 are provided with the same reference numerals and not described again.

While the horn antenna of Embodiment 1 includes the metallic horn and the circular waveguide which are separately fabricated, these elements may be alternatively fabricated as a single, combined unit as seen in FIG. 2. It is preferable that the metallic horn 2A and the circular waveguide 1A have the same outer diameter, which makes it easier to fabricate the single, combined unit.

In addition, the horn antenna of Embodiment 2 includes a dielectric horn 3A which has a flared end section 36A and a second impedance matching section 35A but has no hollow rod section unlike the dielectric horn 3 used in the horn antenna of Embodiment 1 (see FIG. 1). Thus, the flared end section 36A and the second impedance matching section 35A are in direct connection with each other. Further, the second impedance matching section 35A is formed in a relatively simple shape having only a stepwise shoulder (i.e., defining a circular flat surface structure).

Furthermore, in the horn antenna of Embodiment 2, the metallic horn 2A and the circular wave guide 1 have the same outer diameter.

Embodiment 3

Referring now to FIGS. 3 to 5, a horn antenna according to Embodiment 3 will be described.

In FIG. 3, elements of the horn antenna that are identical or corresponding to those of Embodiment 1 are provided with the same reference numerals and not described again.

The horn antenna according to Embodiment 3 includes a dielectric horn 3B, which is a modification of the dielectric horn 3 used in the horn antenna of Embodiment 1. The dielectric horn 3B includes a flared end section 36 having a front end 31a. (This is also the front end of the dielectric horn 3B.) The front end 31a has an annular frontal edge, and the dielectric horn 3B has a plurality of protrusions 38 which are triangular in shape, are formed along the annular frontal edge, and extend forward from the annular frontal edge. More particularly, the triangular protrusions 38 are cyclically formed with equidistance, along the entire annular frontal edge of the front end 31a of the flared end section 36. As the result, the annular frontal edge of the front end of the dielectric horn 3B is formed to have serrations. In this structure, the distance D from the front end of the dielectric horn 3B to a second impedance matching section 35 may be considered either as the distance from the valleys of the serrations (and thus from the front end 31a of the flared end section 36) to the second impedance hatching section 35 like the horn antenna of Embodiment 1, or as the distance from the apexes 38a of the protrusions 38 to the second impedance matching section 35.

Referring now to FIGS. 4 and 5, operation and advantages of the horn antenna of Embodiment 3 will be described.

In cases where the horn antenna is used in a humid atmosphere, water droplets tend to be deposited on the surface of the dielectric horn 3. In addition, where the horn antenna is used as an antenna of a radar level gauge, it is mounted in site with the front end thereof directed downwards, so that the deposited water droplets run down the surface and are collected on the frontal edge of the horn antenna.

As shown in FIG. 4, with a horn antenna in which the dielectric horn 3 (and thus the flared end section 36) has a straight (i.e., non-serrated) frontal edge, relatively many water droplets 41 may be gathered on and along the frontal edge, so that part of the power of the electromagnetic waves supplied to the horn antenna may be possibly reflected by the frontal edge and returned to the main unit of the radar level gauge, causing degradation of the performance of the radar level gauge in relation to its electrical characteristics.

As shown in FIG. 5, in contrast to the above, with the horn antenna in which the flared end section 36 has the triangular protrusions 38 which are formed with cyclicity along the frontal edge, any water droplets running down the surface are guided to the apexes 38a of the triangular protrusions 38, resulting in that only few of the water droplets 41 can be retained on and along the frontal edge of the antenna. Consequently, relatively little of the power of the electromagnetic waves may be reflected by the frontal edge of the antenna, leading to an improvement in the performance of the radar level gauge in relation to its electrical characteristics.

With the horn antennas of the above described embodiments, the internal space of the metallic horn, as well as the internal space of the flared end section of the dielectric horn, is formed to be conical frustum in shape. Alternatively, and of course, these internal spaces may be formed to be pyramidal frustum in shape. In such cases, the metallic horn and the dielectric horn are formed such that the outer contour of the cross section of the metallic horn, the outer contour of the cross section of the dielectric horn, and the respective cross sections of the internal spaces of the metallic horn and the dielectric horn are all square in shape, and the first impedance matching section extending rearward into the waveguide is pyramidal in shape.

Further, with the horn antenna of Embodiment 3, the protrusions 38 are formed with triangular in shape. Alternatively, such a protrusion 38 may be formed in any of other shapes as long as it has a relatively wide proximal end (at which it is in connection with the frontal edge 31a) and is narrowed toward its tip end (or apex 38a).

The present invention may be embodied in other various specific forms without departing from the spirit or essential characteristics thereof. The embodiments described above are therefore to be considered in all respects as illustrative and not restrictive. The scope of the present invention is defined solely by the appended claims and is not affected by the foregoing detailed description. Further, all changes, improvements, substitutions and alterations which come within the range of equivalency of the claims are embraced within the scope of the present invention.

LIST OF REFERENCE NUMERALS

1 Circular waveguide
1A Circular waveguide
2 Metallic horn
2A Metallic horn
3 Dielectric horn
3A Dielectric horn
3B Dielectric horn
4 First PFA tube
5 Second PFA tube
21 Conical frustum shaped internal space
31 Conical frustum shaped internal space
31A Conical frustum shaped internal space
32 Metallic horn filler section
33 Waveguide filler section
34 First impedance matching section
35 Second impedance matching section
35A Second impedance matching section
36 Flared end section
36A Flared end section
37 Hollow rod section
38 Protrusion
38a Apex

What is claimed is:

1. A horn antenna, comprising:
a metallic horn including a front end and a rear end, the rear end being adapted for connection with a waveguide having a cross section of a constant shape; and
a dielectric horn including a front end and a rear end, the dielectric horn being connected with the metallic horn and extending forward from the front end of the metallic horn,
wherein the metallic horn includes:
an opening at the rear end thereof, which has a cross section corresponding to the cross section of the waveguide; and
a conical frustum shaped internal space flaring out from the opening toward the front end of the metallic horn,
wherein the dielectric horn comprises:
a metallic horn filler section including a front end and a rear end, the metallic horn filler section being adapted for filling the conical frustum shaped internal space of the metallic horn;
a waveguide filler section including a rear end, the waveguide filler section being formed to extend rearward from the rear end of the metallic horn filler section and adapted for filling an internal space of a section of a predetermined length of the waveguide;
a first impedance matching section formed at the rear end of the waveguide filler section and adapted for establishing impedance matching between the waveguide and the dielectric horn;
a second impedance matching section formed at the front end of the metallic horn filler section and at a center of a cross section of the metallic horn filler section, and adapted for establishing impedance matching between the dielectric horn and air; and
a flared end section including a frustum shaped internal space, which is formed to flare out from in a front of the second impedance matching section toward the front end of the dielectric horn and opens at the front end of the dielectric horn,
wherein the metallic horn and the flared end section of the dielectric horn have respective cross sections whose outer contours are the same as each other and correspond to the outer contour of the cross section of the waveguide, and
wherein the outer contour of the cross section perpendicular to a longitudinal direction of a tip of the metallic horn and the outer contour of the cross section perpendicular to the longitudinal direction of the flared end section of the dielectric horn have same shapes and equal sizes thereof.

2. The horn antenna according to claim 1, wherein the waveguide is integrally connected with the rear end of the metallic horn.

3. The horn antenna according to claim 1, wherein the waveguide includes a circular waveguide, the metallic horn has the cross section having the outer contour which is circular in shape, and the dielectric horn has a cross section having an outer contour which is circular in shape.

4. The horn antenna according to claim 1, wherein the waveguide has a cross section having an outer contour which is smaller than the outer contour of the cross section of the metallic horn.

5. The horn antenna according to claim 1, wherein the waveguide and the metallic horn have respective outer circumferential surfaces covered by at least one fluoropolymer resin tube.

6. The horn antenna according to claim 5, wherein the at least one fluoropolymer resin tube comprises a first tube comprising a perfluoroalkoxy polymer and covering the outer circumferential surface of the metallic horn and a second tube comprising a perfluoroalkoxy polymer and covering the outer circumferential surface of the waveguide, the first and second tube being separate from each other.

7. The horn antenna according to claim 1, wherein the front end of the dielectric horn includes an annular frontal edge, and the dielectric horn include a plurality of protrusions formed along the annular frontal edge and extending forward from the annular frontal edge.

8. The horn antenna according to claim 7, wherein the protrusions are triangular in shape so that the annular frontal edge of the front end of the dielectric horn includes serrations.

9. The horn antenna according to claim 1, wherein the tip of the metallic horn is located at the front end of the metallic horn.

10. The horn antenna according to claim 1, wherein the second impedance matching section is located directly at the front end of the metallic horn filler section.

11. The horn antenna according to claim 1, wherein the second impedance matching section is located directly at the center of the cross section of the metallic horn filler section.

12. The horn antenna according to claim 1, wherein the second impedance matching section is located at the outer contour of the cross section perpendicular to the longitudinal direction of the tip of the metallic horn.

13. The horn antenna according to claim 1, further comprising:
    a hollow rod section including a cylindrical axial hole which extends from the front end of the second impedance matching section to the flared end section.

14. The horn antenna according to claim 13, wherein the second impedance matching section is located at a rear end of the hollow rod section and includes:
    a first tapering surface arranged to be in a direct contact with the hollow rod section.

15. The horn antenna according to claim 14, wherein the second impedance further includes:
    a second tapering surface including a step portion located relative to the first tapering surface.

* * * * *